United States Patent Office 2,721,799
Patented Oct. 25, 1955

2,721,799

SENSITIZED PHOTOGRAPHIC EMULSIONS

Harry Derek Edwards, Frank Peter Doyle, and Stanley John Palling, Barnet, England, assignors, by mesne assignments, to Eastman Kodak Company, Rochester, N. Y., a corporation of New Jersey No Drawing. Application October 18, 1951, Serial No. 252,006

Claims priority, application Great Britain October 19, 1950

8 Claims. (Cl. 95—7)

This invention relates to photographic emulsions sensitized with new dyestuffs of the polymethine type.

An object of the invention is to provide photographic silver halide emulsions of improved sensitivity to light by incorporating therein new polymethine type dyestuffs as sensitizers.

According to the present invention a photographic emulsion is sensitized by a polymethine dyestuff having the terminal grouping:

$$NC-C=C-C=\atop{\underset{R^3}{|}\phantom{xx}\underset{OR^2}{|}\phantom{xx}\underset{R^1}{|}}$$
(I)

wherein $R^1$ is either hydrogen or alkyl; $R^2$ is alkyl; and $R^3$ is CN, COOH, CO·C$_6$H$_5$ or CO·NH·C$_6$H$_5$.

Preferably the dyestuff is completed by one of the following groupings:

$$(=CH-CH)_n=C\underset{\underset{R^4}{|}}{\overset{Z}{\diagup}\atop\diagdown N}$$
(II)

$$=CH-(CH=CH-)_n\diagup\!\!\!\!\bigcirc\!\!\!\!\diagdown\overset{R^5}{\underset{R^6}{N\diagdown}}$$
(III)

wherein $R^4$, $R^5$ and $R^6$ are alkyl; Z is the residue of a heterocyclic nucleus; and $n$ is either zero or a low integer.

To produce the dyestuffs, an intermediate of the formula:

$$\underset{R^3}{\overset{CN}{\underset{|}{C}}}\,\,\underset{OR^2}{\overset{CH_2R^1}{\underset{|}{C}}}$$
(IV)

is reacted with a second intermediate capable of reacting with the methylene group (—CH$_2$R$^1$) but not with the alkoxy group (—OR$^2$) of the first mentioned intermediate.

As the second intermediate it is preferred to employ a 2-alkylmercapto or a 2-ω-acetanilidovinyl or a 2-ethyl-mercaptovinyl derivative of a cyclammonium quaternary salt.

Conveniently the second intermediate has one or other of the following formulae:

$$Y(-CH=CH)_n-C\underset{X}{\overset{Z}{\diagup}\atop\diagdown N\diagdown R^4}$$
(V)

$$OHC-(CH=CH-)_n\diagup\!\!\!\!\bigcirc\!\!\!\!\diagdown\overset{R^5}{\underset{R^6}{N\diagdown}}$$
(VI)

wherein $R^4$, $R^5$, $R^6$, Z and $n$ are as previously mentioned, X is an anion, and Y is a group reactive with a methylene group, for example, alkylmercapto, acetanilido, or a halogen.

The nature of the reaction between the intermediates is exemplified by the following illustrations.

$$\underset{\underset{R^3}{|}\phantom{xx}\underset{OR^2}{|}}{\overset{CN}{\underset{|}{C}}\,\,\overset{R^1C}{\underset{\|}{C}}}\cdots\overset{[H]-[Y]}{\phantom{xxxxx}}(-CH=CH)_n-C\underset{[X]}{\overset{Z}{\diagup}\atop\diagdown N\diagdown R^4}$$

↓

$$NC-\underset{R^3}{\overset{|}{C}}=\underset{OR^2}{\overset{|}{C}}-\underset{R^1}{\overset{|}{C}}=(CH-CH=)_n C\underset{\underset{R^4}{|}}{\overset{Z}{\diagup}\atop\diagdown N}$$

$$+\,HX+HY$$
(VII)

$$\underset{\underset{R^3}{|}\phantom{xx}\underset{OR^2}{|}}{\overset{CN}{\underset{|}{C}}\,\,\overset{R^1C}{\underset{\|}{C}}}\cdots\overset{[H_2]--[O]}{\phantom{xxxxx}}HC-(CH=CH-)_n\diagup\!\!\!\!\bigcirc\!\!\!\!\diagdown\overset{R^5}{\underset{R^6}{N\diagdown}}$$

↓

$$NC-\underset{R^3}{\overset{|}{C}}=\underset{OR^2}{\overset{|}{C}}-\underset{R^1}{\overset{|}{C}}=CH-(CH=CH-)_n\diagup\!\!\!\!\bigcirc\!\!\!\!\diagdown\overset{R^5}{\underset{R^6}{N\diagdown}}$$

$$+\,H_2O$$
(VIII)

The reaction is preferably carried out in the presence of a basic condensing agent capable of reacting with the product or products split off during the reaction. A mixture of alcohol and triethylamine, or of acetic anhydride and triethylamine, is a suitable agent in many cases.

The intermediates of Formula IV may be prepared by the condensation of ortho esters with substances having an active methylene group, for example:

$$\underset{\underset{OEt}{|}}{\overset{CH_3}{\underset{|}{C}}}\!\!-OEt\,+\,\underset{CN}{\overset{CN}{\diagdown}}C=H_2\longrightarrow\underset{\underset{CN}{|}}{\overset{CN}{\underset{\|}{C}}}\!\!=\!\!\underset{OEt}{\overset{CH_3}{\underset{|}{C}}}\,+\,2EtOH$$

This reaction can proceed at room temperature with good yields, in the absence of a solvent or condensing agent. (Vila & Ballester; Anales real soc. espan. fis. y quim. (Spain), 45B, 87–8 (1949). Chemical Abstracts 42, 8179 g. Also Chemical Abstracts 44, 3884 i.)

In other references the presence of a condensing agent such as acetic anhydride is considered desirable, as for instance in the reaction of orthoacetates and orthobenzoates with malononitrile, ethyl cyanoacetate, and dimethyl malonate. (Vila & Jarque, Anales fis. y quim. (Spain), 40, 946–50 (1944). Chemical Abstracts 39, 4329⁵, 1945.)

Preparations of particular compounds of Formula IV are described in the following Examples 1 to 4. In these and in all subsequent examples, parts given are by weight.

EXAMPLE 1

*1;1 dicyano-2-ethoxy-1-butene*

$$\underset{OC_2H_5}{\overset{CN}{\underset{|}{C_2H_5-C=C}}}\underset{CN}{\diagdown}$$

Malononitrile (13.2 gms.) was dissolved in ethyl ortho propionate (34 gms.), a trace of anhydrous zinc chloride added, and the mixture was refluxed for 1½ hours. After this time the reflux condenser was moved to the distillation position and the solution was distilled at ordinary pressure. Ethyl alcohol distilled off and left a dark oil residue which was then distilled under reduced pressure. The product was a dark yellow oil boiling up to 160°/15 mm., and on fractionating was obtained as a colourless oil boiling at 150–153°/15 mm. which set to a white crystalline solid.

EXAMPLE 2

*2 cyano-3-ethoxy-2-propenoic acid*

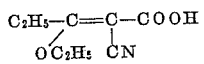

Cyano acetic acid (4.25 gms.) and ethyl ortho acetate (10.0 ccs.) were shaken up in a stoppered flask and allowed to stand several days. A solid had deposited during this time, and after filtering off and washing with ethanol, melted at 152–3°.

EXAMPLE 3

*1-benzoyl-1-cyano-2-methoxy-1-propene*

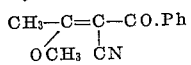

Benzoyl acetonitrile (7.2 gms.) and methyl ortho acetate (7.5 ccs.) were refluxed together with a trace of anhydrous zinc chloride for ½ hour.

The solution was then distilled, at atmospheric pressure, leaving an oil which was distilled under reduced pressure. It boiled at 170–180°/16 mm. giving the product in the form of a yellow oil which solidified to light yellow needles.

EXAMPLE 4

*1-cyano-1-phenylamido-2-ethoxy-1-propene*

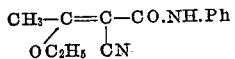

Cyano acetanilide (8.0 gms.) and ethyl ortho acetate (25 ccs.) were refluxed together with a trace of anhydrous zinc chloride for ½ hour.

On chilling overnight the product separated and was obtained as fine white needles melting at 165–166° C. on recrystallising from ethanol.

The following Examples 5 to 16 illustrate certain dyestuffs suitable for the invention and their manner of preparation.

EXAMPLE 5

*1;1 dicyano-2-ethoxy-4-p-dimethylamino phenyl 1;3 butadiene*

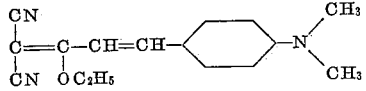

2.70 parts of 1;1 dicyano-2-ethoxy propene, and 3.0 parts of p-dimethylamino benzaldehyde were refluxed together in 20 parts of absolute ethanol containing 3 parts of piperidine for 1 hour.

The alcohol was removed by distillation under reduced pressure and the residue cooled. An orange solid was obtained which was filtered off and recrystallised from dry benzene. M. Pt. 167°.

EXAMPLE 6

*1;1 dicyano-2-ethoxy-3-(3 ethyl-2;3 dihydro benzthiazolyl-idene-2-)-1-propene*

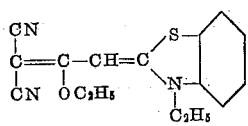

1.94 parts of 2 ethyl mercapto benzthiazole and 2.0 parts of ethyl-p-toluene sulphonate were fused together for 3 hours in an oil bath at 150° C. The melt was dissolved in 25 parts of ethyl alcohol, 1.36 parts of 1;1 dicyano-2-ethoxy propene, and 3.0 parts of triethylamine added, and the solution refluxed for 30 minutes. On chilling, the dye separated and after filtering and drying, was recrystallised from dry benzene in the form of bright yellow crystals melting at 190°.

When incorporating in a silver chloro-bromide photographic emulsion the sensitivity was extended to 5100 Å.

EXAMPLE 7

*1;1 dicyano-2-ethoxy-5-(3 ethyl-2;3 dihydro thiazolinyl-idene-2-)-1;3 pentadiene*

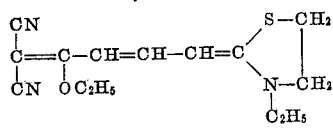

1.36 parts of 1;1 dicyano-2-ethoxy propene and 4.02 parts of 2-ω-acetanilidovinyl thiazoline ethiodide were refluxed together in 25 ccs. of ethyl alcohol containing 3 parts of triethylamine for 30 minutes. The solvent was then removed by distillation under reduced pressure leaving an oil which was dissolved in hot benzene. The dyestuff was precipitated by petroleum ether and the solid so obtained recrystallised from dry benzene in the form of shining blue crystals melting at 138° C.

When the dye was incorporated in a gelatino-silver halide photographic emulsion, the sensitivity was extended to 5800 Å with a maximum at 5250 Å.

EXAMPLE 8

*1;1 dicyano-2-ethoxy-5-(3 ethyl-5-chloro-2;3 dihydro-benzthiazolylidene-2-)-1;3-pentadiene*

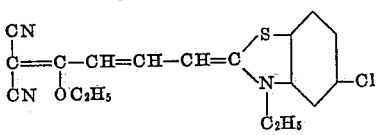

1.83 parts of 2 methyl-5-chloro benzthiazole and 2.0 parts of ethyl-p-toluene sulphonate were fused together at 150° in an oil bath for 3 hours. The melt was then dissolved in 25 parts of acetic anhydride, 2.1 parts of triethyl trithio ortho formate added, and the solution refluxed for 30 minutes, during which time the colour of the solution faded and became dull yellow.

The acetic anhydride was removed by distillation under reduced pressure, leaving a thick oil which was washed several times with ether and dissolved in 25 parts of ethyl alcohol.

1.36 parts of 1;1 dicyano-2-ethoxy propene and 3.0 parts of triethylamine were added to this solution which was refluxed for 1 hour. The alcohol was removed by distillation under reduced pressure and the residue on cooling deposited a solid dye, which was filtered and recrystallised from dry benzene. The dye melted at 192° or 210° C. after recrystallising several times for analysis.

When incorporated in a silver chloro bromide photographic emulsion the sensitivity was extended to 6500 Å, with a maximum of 6200 Å.

EXAMPLE 9

*1;1 dicyano-2-ethoxy-5-(1;3;3' trimethyl 1;2 dihydro-indolenylidene-2-)-1;3 pentadiene*

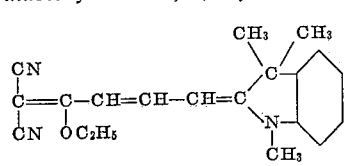

2.7 parts of 1;1 dicyano-2-ethoxy propene and 9.0 parts of 2-ω-acetanilidovinyl 3;3 dimethyl indolenine methiodide were refluxed together in 200 cc. of ethanol containing 6 parts of triethylamine for 1 hour.

The solution on cooling deposited the dyestuff which was filtered off, dried and recrystallised from dry benzene in the form of shining purple crystals melting at 198° C.

When incorporated in a silver bromo iodide photographic emulsion this dyestuff extended the sensitivity to 5900 Å, with a maximum at 5500 Å.

EXAMPLE 10

1;1 dicyano-2-ethoxy-5-(3 ethyl-2;3 dihydro-4;5 naphthoxazolylidene-2-) 1;3 pentadiene

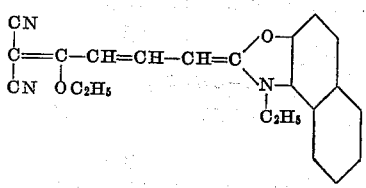

1.36 parts of 1;1 dicyano-2-ethoxy propene and 5.2 parts of 2-ω-acetanilidovinyl 4;5 naphthoxazole ethyl-p-toluene sulphonate were suspended in 20 parts of hot acetic anhydride and 3.0 parts of triethylamine added. A red dye colour was produced immediately and the suspended solid dissolved.

The solution was refluxed for 15 minutes and then the bulk of the solvent was removed by distillation. Ethyl alcohol was added to the hot residue and the resulting solution was then cooled and allowed to stand overnight.

The dyestuff which separated was filtered and dried, and recrystallised from dry benzene, having a melting point of 210–211°.

When the dye was incorporated in a gelatino silver halide photographic emulsion it extended the sensitivity to 6000 Å with a maximum at 5500 Å.

EXAMPLE 11

1;1 dicyano-2-ethoxy-3-methyl-5-(3-ethyl-2:3 dihydrobenzthiazolylidene-2-)-1;3 pentadiene

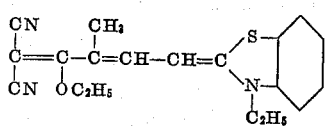

1.5 parts of 1;1 dicyano-2-ethoxy-1-butene (prepared as in Example 3) 4.5 parts of 2-ω-acetanilidovinyl benzthiazole ethiodide, 75 parts of pyridine and 3.0 parts of triethylamine were refluxed together for 30 minutes.

The dyestuff was deposited on cooling, and after filtering and drying was recrystallised several times from dry benzene, having a final melting point at 180°.

EXAMPLE 12

1;1 dicyano-2-ethoxy-3-methyl-5-(1-ethyl 1:2 dihydroquinolylidene-2-) 1;3 pentadiene

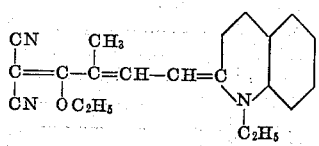

4.4 parts of 2-ω-acetanilidovinyl quinaldine ethiodide and 1.5 parts of 1;1 dicyano-2-ethoxy-1-butene (prepared as in Example 3) were dissolved in 50 parts of hot ethyl alcohol and 3.0 parts of triethylamine added.

The solution was refluxed for 20 minutes, and allowed to stand over two days.

A solid product was deposited, which was filtered off, dried, and then recrystallised from dry benzene, to give the dyestuff in the form of dark green crystals, melting at 166° C.

When the dye was incorporated in a gelatino-silver halide photographic emulsion, the sensitivity was extended to beyond 7000 Å, with a maximum at 5200 and 6000 Å.

EXAMPLE 13

1;1 dicyano-2-ethoxy-3-methyl-5-(3 ethyl-2;3 dihydro-4;5 naphthoxazolylidene-2-)-1;3 pentadiene

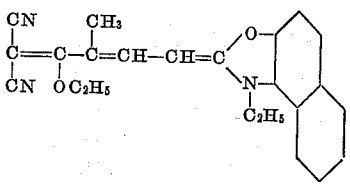

1.5 parts of 1;1 dicyano-2-ethoxy-1-butene (prepared as in Example 3) and 5.2 parts of 2-ω-acetanilidovinyl-4;5-naphthoxazole ethyl p-toluene sulphonate were suspended in 20 parts hot acetic anhydride and 3 parts of triethylamine added. A red dye colour was produced immediately, and the suspended solid dissolved.

The solution was refluxed for 15 minutes and then the bulk of the solvent was removed by distillation. Ethyl alcohol was added to the hot residue, to decompose any remaining acetic anhydride and the resulting solution was then cooled and allowed to stand overnight.

The dyestuff which crystallised was filtered and dried and then recrystallised from dry benzene to give maroon coloured solid melting at 226°.

When the dye was incorporated in a gelatino-silver halide photographic emulsion, the sensitivity was extended to 6100 Å with a maximum at 5400 Å.

EXAMPLE 14

1;1 dicyano-2-ethoxy-9-(3 ethyl-2;3 dihydro benzthiazolylidene-2-)-1;3;5;7 nona tetraene

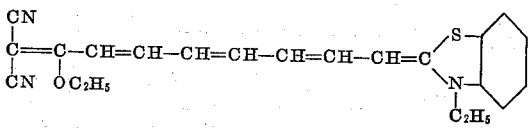

5.02 parts of 2-ω-acetanilido-1;3;5 hexatrienyl benzthiazole ethiodide and 1.36 parts of 1;1 dicyano-2-ethoxy propene were refluxed together on the water bath in 25 parts of ethyl alcohol containing 3 parts of triethylamine for 10 minutes.

A bright blue solution developed, and the alcohol was removed by distillation under reduced pressure. The residue was cooled, diluted, extracted with benzene and the benzene solution dried with anhydrous sodium sulphate. On filtering and distillation of the benzene on the water bath a solid residue was obtained which was then recrystallised from methanol. The melting point was 168°.

When the dye was incorporated in a gelatino silver halide photographic emulsion the sensitivity was extended to the infra-red region of the spectrum.

EXAMPLE 15

2-cyano-3-ethoxy-6-(3 ethyl-2;3 dihydro benzthiazolylidene-2-)-2;4 hexadienoic acid

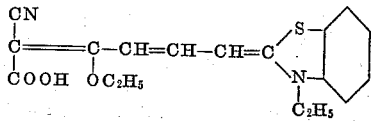

1.3 parts of 2-cyano-3-ethoxy-2-propenoic acid (prepared in Example 4) and 4.0 parts of 2-ω-acetanilidovinyl benzthiazole ethiodide were refluxed together in 40 parts of pyridine for 30 minutes. The pyridine was then removed by distillation under reduced pressure and the residue cooled, and diluted. The product was filtered, dried, and extracted with dry benzene. On removing the benzene the dye was obtained and purified by recrystillisation from methanol. The dye melted at 206°.

When the dye was incorporated in a gelatino silver halide photographic emulsion the sensitivity was extended to 6000 Å with a maximum at 5600 Å.

EXAMPLE 16

*1 benzoyl-1-cyano-2-methoxy-3-(3 ethyl-2;3 dihydro-benzthiazolylidene-2-)-1-propene*

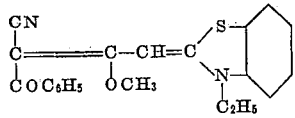

1.0 parts of 1 benzoyl-1-cyano-2-methoxy-1-propene (prepared as in Example 5) and 2.0 parts of 2-ethyl mercapto benzthiazole ethyl-p-toluene sulphonate were refluxed together with 1.5 parts of triethylamine in 10 parts of ethyl alcohol, for 5 minutes. On cooling, the dye was deposited and was recrystallised from dry benzene in the form of yellow crystals melting at 226° C.

What we claim as our invention and desire to secure by Letters Patent is:

1. A photographic silver halide emulsion sensitized with a dyestuff selected from the group consisting of those represented by the following two general formulas:

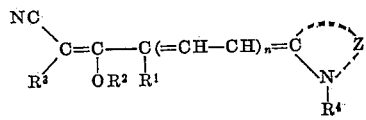

and

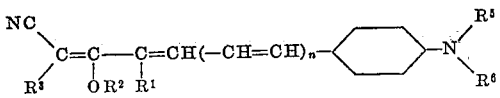

wherein $R^1$ represents a member selected from the group consisting of a hydrogen atom and an alkyl group, $R^2$, $R^4$, $R^5$, and $R^6$ each represents an alkyl group, $R^3$ represents a radical selected from the group consisting of cyano, carboxyl, benzoyl, and carbanilyl, $n$ represents a whole numeral from zero to three, and Z represents the non-metallic atoms necessary to complete a heterocyclic nucleus containing five atoms in the heterocyclic ring.

2. A photographic silver halide emulsion sensitized with a dyestuff selected from those represented by the following general formula:

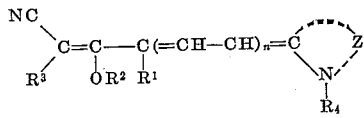

wherein $R^1$ represents a member selected from the group consisting of a hydrogen atom and a methyl group, $R^2$ and $R^4$ each represents a member selected from the group consisting of a methyl group and an ethyl group, $R^3$ represents a member selected from the group consisting of cyano, carboxyl, benzoyl, and carbanilyl, $n$ represents a whole numeral from zero to three, and Z represents the non-metallic atoms necessary to complete a heterocyclic nucleus selected from the group consising of a benzothiazole nucleus, a thiazoline nucleus, a 3,3-dimethylindolenine nucleus, a 4:5-naphthoxazole nucleus, and a quinoline nucleus.

3. A photographic silver halide emulsion sensitized with a dyestuff selected from those represented by the following general formula:

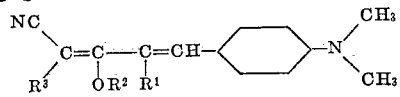

wherein $R^1$ represents a member selected from the group consisting of a hydrogen atom and a methyl group, $R^2$ represents a member selected from the group consisting of a methyl group and an ethyl group, and $R^3$ represents a member selected from the group consisting of cyano, carboxyl, benzoyl, and carbanilyl.

4. A photographic silver halide emulsion sensitized with a dyestuff having the following formula:

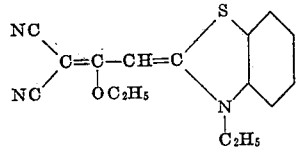

5. A photographic silver halide emulsion sensitized with a dyestuff having the following formula:

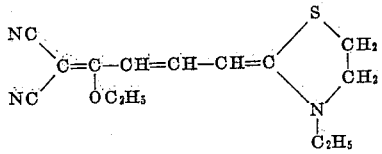

6. A photographic silver halide emulsion sensitized with a dyestuff having the following formula:

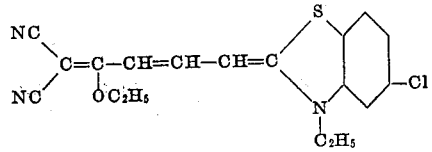

7. A photographic silver halide emulsion sensitized with a dyestuff having the following formula:

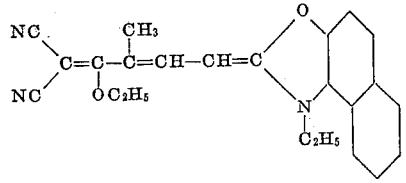

8. A photographic silver halide emulsion sensitized with a dyestuff having the following formula:

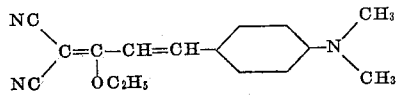

References Cited in the file of this patent

UNITED STATES PATENTS

| Number | Name | Date |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,511,210 | Kendall et al. | June 13, 1950 |
| 2,533,233 | Edwards et al. | Dec. 12, 1950 |
| 2,603,642 | Edwards et al. | July 15, 1952 |
| 2,638,473 | Edwards et al. | May 12, 1953 |

OTHER REFERENCES

Chemical Abstracts 16:3101 (Abstract of Brit. Med. Journal, 1922, I, 514–515).

Chemical Abstracts 19:530 (Abstract of Proc. Roy. Soc., London, 96 B, 317–333, 1924).